United States Patent
Petersen et al.

(10) Patent No.: US 10,566,587 B2
(45) Date of Patent: Feb. 18, 2020

(54) ELECTRIFIED VEHICLE PLATE WITH INTEGRATED COMPRESSION LIMITER

(71) Applicant: FORD GLOBAL TECHNOLOGIES, LLC, Dearborn, MI (US)

(72) Inventors: Peter Eric Petersen, Royal Oak, MI (US); Brian Utley, Canton, MI (US); David Moschet, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1112 days.

(21) Appl. No.: 14/685,891

(22) Filed: Apr. 14, 2015

(65) Prior Publication Data

US 2016/0308178 A1    Oct. 20, 2016

(51) Int. Cl.
*H01M 2/10* (2006.01)
*H01M 10/625* (2014.01)
*H01M 10/6554* (2014.01)

(52) U.S. Cl.
CPC ....... *H01M 2/1077* (2013.01); *H01M 10/625* (2015.04); *H01M 10/6554* (2015.04); *H01M 2220/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0052965 A1* | 3/2011 | Kim | ........... | H01M 2/0247 429/156 |
| 2012/0107659 A1* | 5/2012 | Phlegm | ........... | H01M 10/0413 429/98 |
| 2012/0315508 A1* | 12/2012 | Kurita | ........... | H01M 2/1077 429/7 |
| 2013/0164577 A1* | 6/2013 | Insana | ........... | H01M 2/1077 429/72 |
| 2013/0189559 A1* | 7/2013 | Giere | ........... | H01M 2/1077 429/120 |
| 2014/0370340 A1* | 12/2014 | Kimura | ........... | H01M 2/1077 429/72 |
| 2015/0004469 A1* | 1/2015 | Park | ........... | H01M 2/1077 429/151 |
| 2015/0214522 A1* | 7/2015 | Muck | ........... | B60K 1/04 429/120 |
| 2016/0268562 A1* | 9/2016 | Paramasivam | ..... | H01M 2/1083 |

FOREIGN PATENT DOCUMENTS

| WO | WO 2013/084938 | * | 6/2013 | ........... H01M 10/50 |
|---|---|---|---|---|
| WO | WO 2014/053304 | * | 4/2014 | ........... H01M 2/10 |

\* cited by examiner

*Primary Examiner* — Amanda J Barrow
(74) *Attorney, Agent, or Firm* — David Kelley; Carlson, Gaskey & Olds, P.C.

(57) ABSTRACT

An exemplary assembly of an electrified vehicle includes a compression limiter integrated into a plate of a battery pack array. An exemplary method includes forming a portion of a plate of a battery pack array about a longitudinal axis to provide a compression limiter.

20 Claims, 4 Drawing Sheets

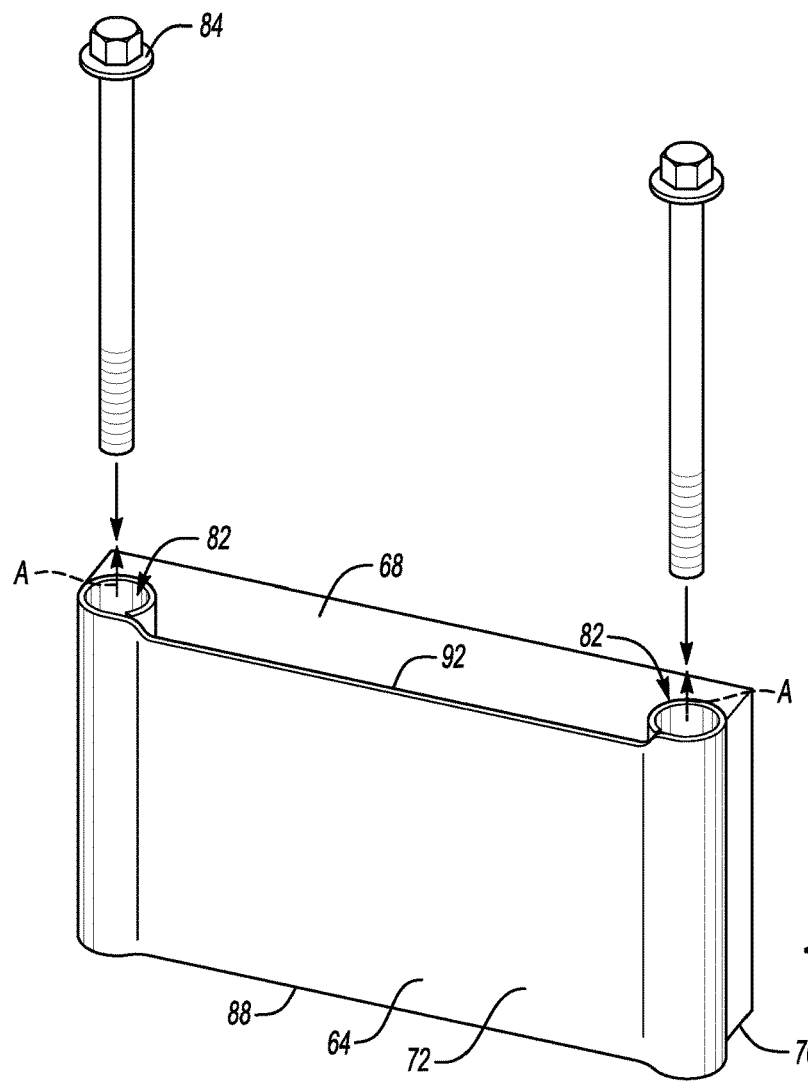
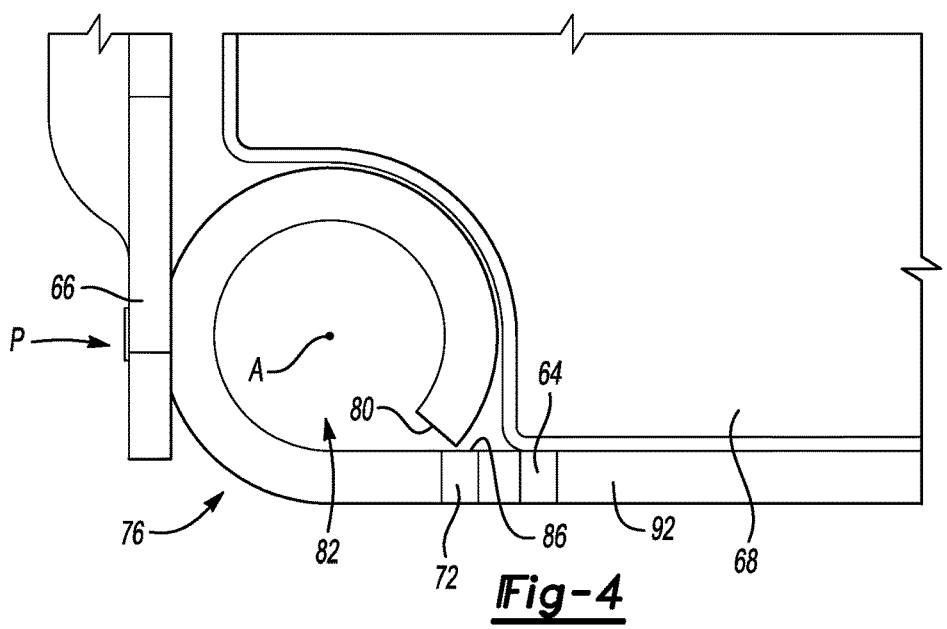

US 10,566,587 B2

ELECTRIFIED VEHICLE PLATE WITH INTEGRATED COMPRESSION LIMITER

TECHNICAL FIELD

This disclosure relates generally to compression limiters of a battery pack for an electrified vehicle and, more particularly, to compression limiters integrated into a plate of the battery pack.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery packs of electrified vehicles include sideplates and endplates secured to a heat exchanger plate. Some known designs utilize compression limiters that are welded to the endplates of the battery pack.

SUMMARY

An assembly according to an exemplary aspect of the present disclosure includes, among other things, a compression limiter integrated into a plate of a battery pack array.

In another example of the foregoing assembly, the compression limiter is integrated into an endplate assembly of the battery pack array.

In another example of any of the foregoing assemblies, the endplate assembly comprises an inner spacer and an outer endplate, and the compression limiter is integrated into the outer endplate.

In another example of any of the foregoing assemblies, the compression limiter is integrated into a sideplate of the battery pack.

In another example of any of the foregoing assemblies, the compression limiter has a longitudinal axis, and the compression limiter is a portion of the plate that is formed about the longitudinal axis.

In another example of any of the foregoing assemblies, the compression limiter has a circular cross-section.

In another example of any of the foregoing assemblies, the compression limiter has a non-circular cross-section.

In another example of any of the foregoing assemblies, the portion of the plate is formed about the longitudinal axis such that a side edge of the plate faces a surface of the plate.

In another example of any of the foregoing assemblies, the surface of the plate is an inwardly facing surface that faces a plurality of cells of the battery pack array.

In another example of any of the foregoing assemblies, the compression limiter provides an opening to receive a mechanical fastener.

In another example of any of the foregoing assemblies, the mechanical fastener secures the plate to a heat exchanger plate.

In another example of any of the foregoing assemblies, the mechanical fastener secures the plate to a battery pack structure other than the heat exchanger plate.

A method according to another exemplary aspect of the present disclosure includes, among other things, forming a portion of a plate of a battery pack array about a longitudinal axis to provide a compression limiter.

In another example of the foregoing method, the plate is an endplate assembly.

In another example of any of the foregoing methods, the endplate assembly comprises an inner spacer and an outer endplate, and the compression limiter is formed within the outer endplate.

In another example of any of the foregoing methods, the plate is a sideplate assembly.

In another example of any of the foregoing methods, the method comprises positioning a fastener within the compression limiter and securing the plate using the fastener.

In another example of any of the foregoing methods, the method comprises securing the plate to a heat exchanger plate using the fastener.

In another example of any of the foregoing methods, the method comprises forming the portion about the longitudinal axis such that a side edge of the plate faces a surface of the plate.

In another example of any of the foregoing methods, the surface of the plate is an inwardly facing surface that faces a plurality of cells of the battery pack array.

DESCRIPTION OF THE FIGURES

The various features and advantages of the disclosed examples will become apparent to those skilled in the art from the detailed description. The figures that accompany the detailed description can be briefly described as follows:

FIG. 3 illustrates a partially exploded view of an endplate assembly from the array of FIG. 2 having integrated compression limiters.

FIG. 4 illustrates a top view of a corner portion of the array of FIG. 2 with mechanical fasteners removed.

DETAILED DESCRIPTION

This disclosure relates generally to a plate for a battery pack of an electrified vehicle. In particular, the disclosure relates to a plate having an integrated compression limiter (or sleeve). The compression limiter provides a rigid connection between the plate and a base plate, for example.

Figure 1:
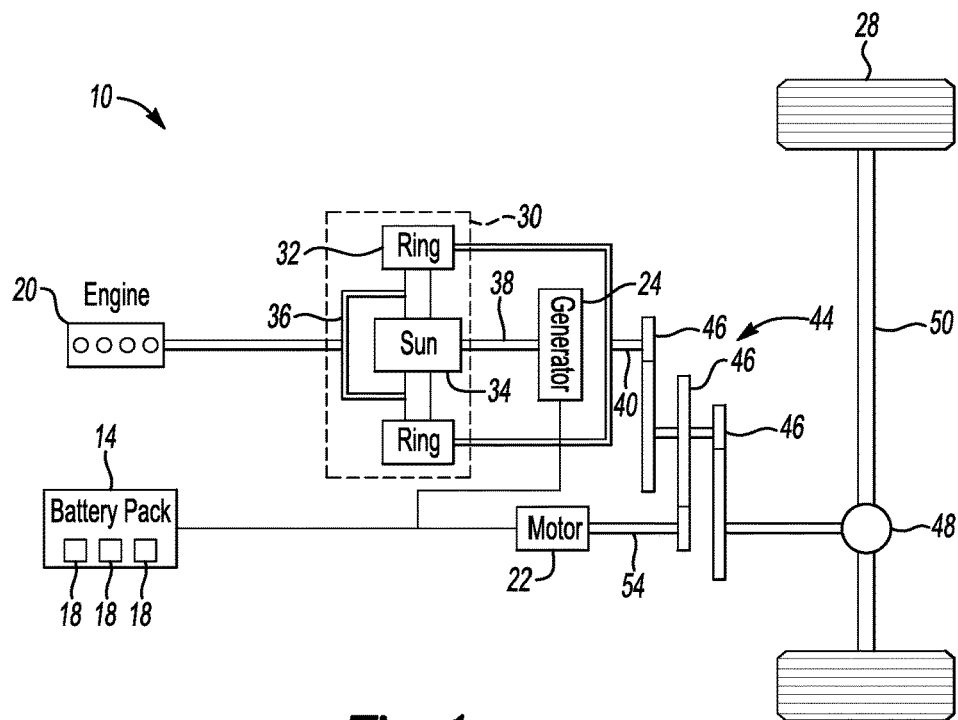
FIG. 1 illustrates a schematic view of a powertrain for an electrified vehicle.
Figure 2:
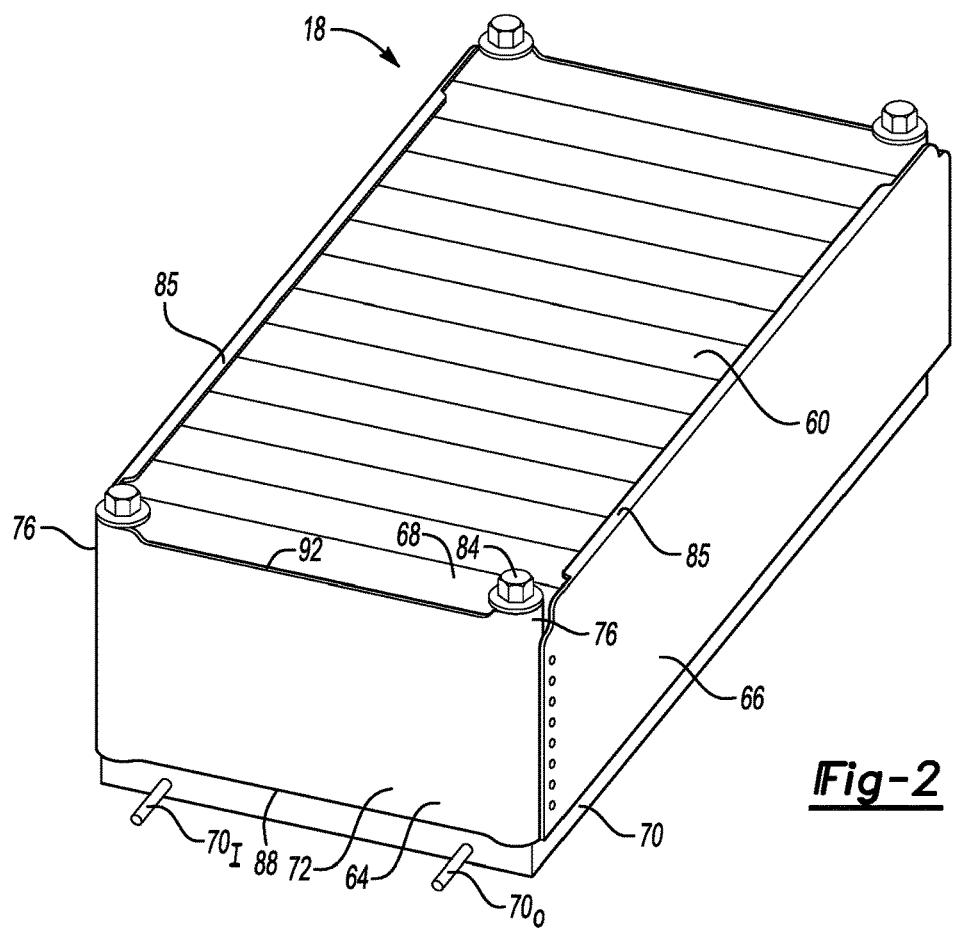
FIG. 2 illustrates a perspective, schematic view of an array from a battery pack of the powertrain of FIG. 1.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Referring now to FIGS. 2 to 6, each array 18 includes a plurality of battery cells 60, endplate assemblies 64, sideplate assemblies 66, and a heat exchanger plate 70.

The heat exchanger plate 70 provides a base plate for the array 18. In some embodiments, the heat exchanger plate 70 does not provide a structural base plate. Instead, the mechanical support comes from separate battery pack structure and the heat exchanger plate is sandwiched between the separate battery pack structure and the battery cells 60.

The array 18 is cooled via liquid coolant communicated through the heat exchanger plate 70. Liquid coolant moves through an inlet $70_I$ to a coolant path established within the heat exchanger plate 70. The liquid coolant moves through the coolant path to exchange thermal energy with the cells 60 and other portions of the array 18. The liquid coolant exits from the heat exchanger plate 70 at an outlet $70_O$. The liquid coolant is used to cool the cells 60 in this example. In another example, the liquid coolant could be used to heat the cells 60.

Although the example cells 60 are shown as liquid cooled, the cells 60 can be air cooled in other examples.

The example endplate assemblies 64 include an inner spacer 68 and an outer endplate 72. The example inner spacer 68 is primarily a polymer material, such as a glass reinforced nylon. The outer endplate 72 is a metallic material. The inner spacer 68 separates the outer endplate 72 from the battery cells 60 to, among other things, electrically isolate conductive surfaces.

The endplate assembly 64 includes integrated compression limiters 76. In this example, each compression limiter 76 is provided by forming lateral edges of the outer endplate 72 about a respective longitudinal axis A. The forming may involve curving or rolling the lateral edges.

The forming of the laterally outer edge provides an opening 82 that receives a mechanical fastener 84. In the exemplary embodiment, a curled portion of the laterally outer edge includes an inner surface that provides at least a portion of a perimeter of the opening 82. The curled portion is a laterally outermost portion of the outer endplate 72. The inner spacer 68 includes a notch that receives at least some of the curled portion. The mechanical fastener 84 is secured to the heat exchanger plate 70 to hold the endplate assembly 64 against the heat exchanger plate 70, which can facilitate thermal energy exchange between the plurality of cells 60 and the heat exchanger plate 70.

The sideplate assemblies 66 include a lip 85 that extends over portions of the plurality of cells 60. The sideplate assemblies 66 are directly connected to the endplate assembly 64. Thus drawing the endplate assembly 64 downward against the heat exchanger plate 70 pulls the sideplate assemblies 66 downward, which pulls the plurality of cells 60 downward through the lip 85.

In other examples, a structure (not shown) may extend across an upper surface of the cells 60 and connect to the endplate assemblies 64. Torquing the mechanical fasteners draws the endplate assemblies 64 toward the heat exchanger plate 70 and pulls the structure downward to urge the cells 60 toward the heat exchanger plate 70.

The mechanical fasteners 84 are threaded in this example. The compression limiters 76 resist compression associated with torqueing the mechanical fastener 84 into an engaged relationship with the heat exchanger plate 70, which provides a relatively robust and rigid joint.

Although the example mechanical fasteners 84 are secured to the heat exchanger plate 70, the mechanical fasteners could be secured to another structure of the array 18 or pack 14 in another example.

The compression limiters 76 are an integrated feature of the outer endplate 72. That is, the compression limiters 76 are part of a continuous monolithic structure with the remaining portions of the outer endplate 72.

The sideplate assemblies 66 of the array 18 are attached to the outer endplate 72 at a position P. The sideplate assemblies 66 are welded to the outer endplate 72 in this example. Torquing the mechanical fasteners 84 into the heat exchanger plate 70 thus draws the sideplate assemblies 66 toward the heat exchanger plate 70. Subsequently, a physical connection between the sideplate assemblies and the tops of the cells draws the cells 60 toward the heat exchanger plate 70 improving thermal conduction from the cells to the heat exchanger.

The outer endplate 72 includes side edges 80. The outer endplate 72 curls to provide the compression limiters 76 such that the side edges 80 face, and nearly contact, a portion of an inwardly facing surface 86 of the outer endplate 72. That is, in the exemplary embodiment, the curled portions of the outer endplate 72 are curled such that the side edges 80 face a primary surface of the outer endplate 72. The primary surface of the outer endplate 72 interfaces directly with the inner surfaces of the curled portions of the outer endplate 72.

The primary surface of the outer endplate 72 and the inner surfaces of the curled portions together provide the inwardly facing surface 86 of the outer endplate 72. The side edges 80 are spaced from the primary surface of the outer endplate 72 to provide an open gap between the side edges 80 and the primary surface of the inwardly facing surface 86. The inwardly facing surface 86 interfaces with the inner spacer 68. In some examples, the side edges 80 directly contact the inwardly facing surface 86 or may contact inner spacer 68. In the exemplary embodiment, the primary surface of the outer endplate 72 is a part of the inwardly facing surface 86 that faces the battery cells 60. The primary surface of the outer endplate 72 and the side edges 80 are spaced a distance from each other to provide a gap between the primary surface and the side edges 80. The outer endplate 72 further includes an outwardly facing surface opposite the inwardly facing surface 86. The outerwardly facing surface and the inwardly facing surface 86 can each extend from one of the side edges 80 to the other of the side edges 80. The side edges 80 are transverse to the inwardly facing surface 86.

The outer endplate 72 curls such that the compression limiters 76 (FIG. 4) extends continuously nearly 360 degrees about a longitudinal axis A of the compression limiters 76.

Figure 4A:
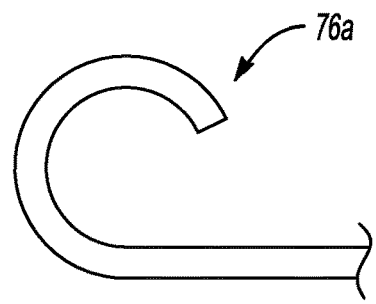
FIG. 4A illustrates another example compression limiter.

In another example, a compression limiter 76a extends a lesser amount around the axis A, such 240 degrees as shown in FIG. 4A, or from 200 to 300 degrees.

Figure 4B:
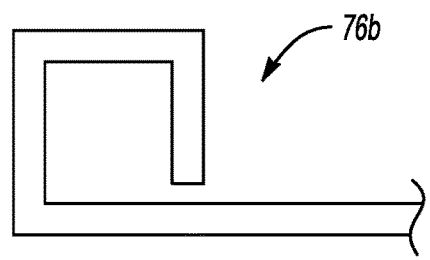
FIG. 4B illustrates yet another example compression limiter.
Figure 4C:
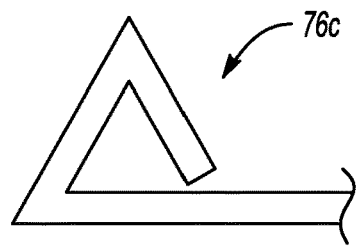
FIG. 4C illustrates still another example compression limiter.
Figure 5:
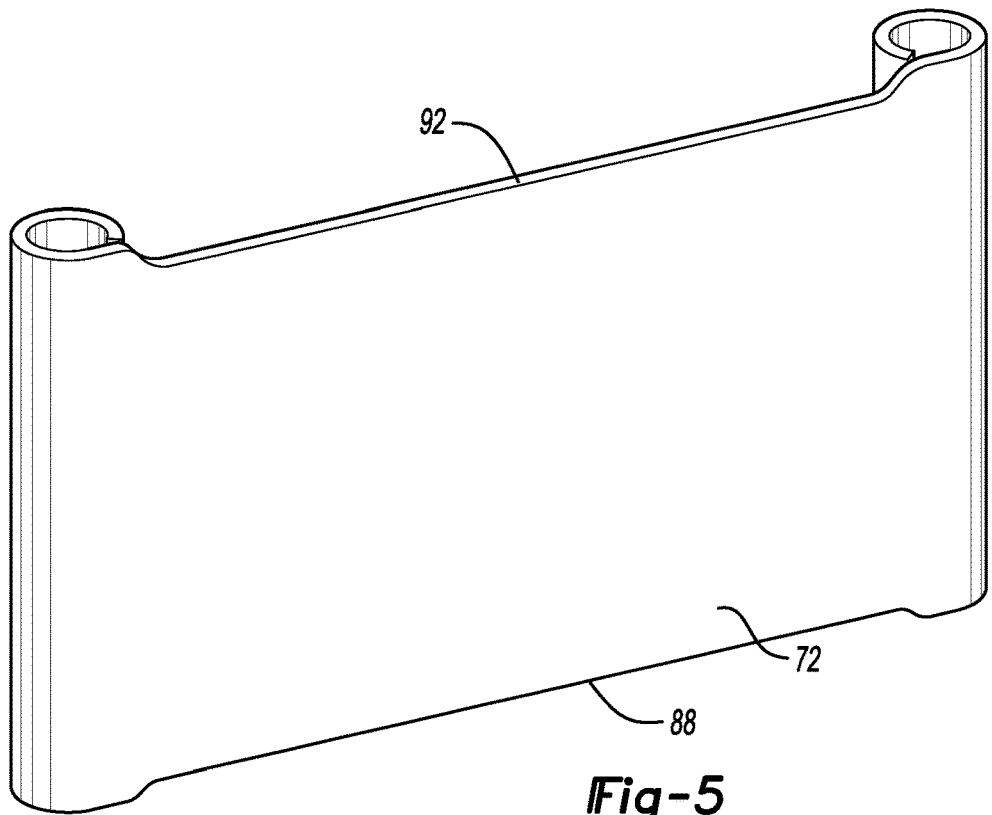
FIG. 5 illustrates a perspective view of an outer endplate from the endplate assembly of FIG. 3.
Figure 6:
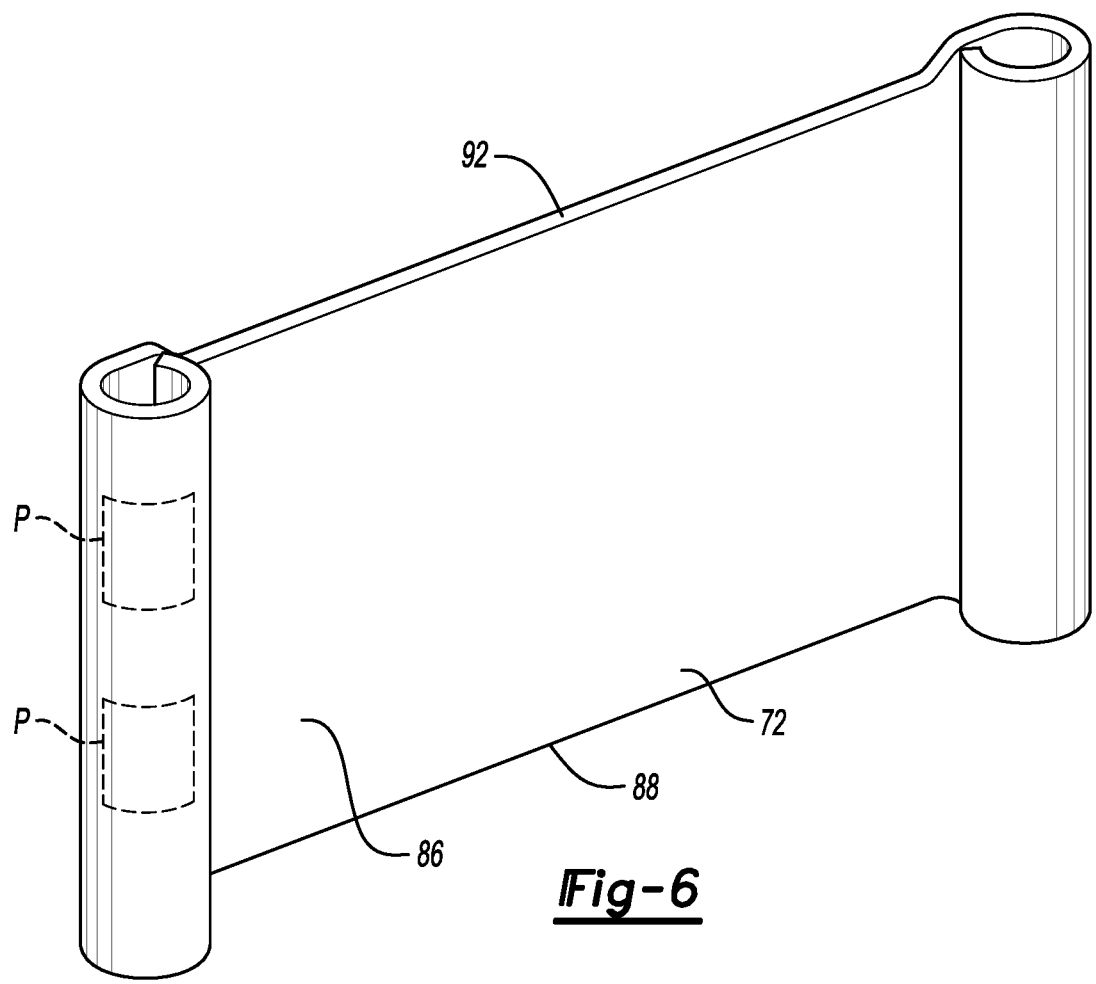
FIG. 6 illustrates another perspective view of the outer endplate from the endplate assembly of FIG. 3.

The compression limiters 76 have a generally circular cross-sectional profile. That is, the compression limiters 76 can have a circular axial cross-section. In another example, the compression limiters can have a non-circular axial cross-section. For example, a compression limiter 76b has a rectangular cross-sectional profile as shown in FIG. 4B. In yet another example, a compression limiter 76c has a triangular cross-sectional profile as shown in FIG. 4C.

The example compression limiters 76 are shown as an integrated portion of the outer endplate 72. In another example, the compression limiter can be an integrated portion of the inner spacer 68. In yet another example, the compression limiter can be an integrated portion of the sideplate assemblies 66.

The example compression limiters 76 extend vertically continuously from a bottom edge 88 of the outer endplate 72 to an upper edge 92 of the outer endplate 72. In another example, portions of the compression limiters 76, such as portions P in FIG. 6, may be removed to reduce weight.

Features of the disclosed examples include a reduction in the number of components required in a battery pack and a reduction in the overall mass. Since the compression limiter is integrated into a plate, no compression limiter separate from the plate is required.

Another feature of the disclosed examples includes a reduction in required packaging space. In one specific example, integrating the compression limiters into the plate reduces the required axial packaging space for the battery pack by about 10 millimeters. Yet, another feature of the disclosed examples includes a reduction in part cost. Since the compression limiter is integrated, no separate manufacturing step is required to secure a compression limiter to a plate.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An assembly, comprising:
a threaded mechanical fastener; and
a compression limiter having a longitudinal axis, the compression limiter integrated into a plate of a battery pack array, the compression limiter a curled portion of the plate that is curled about the longitudinal axis to provide an opening that receives the threaded mechanical fastener, the curled portion including an inner surface that provides at least a portion of a perimeter of the opening, the curled portion curled such that a side edge of the plate faces a primary surface of the plate, the primary surface of the plate interfacing directly with the inner surface.

2. The assembly of claim 1, wherein the compression limiter is integrated into an endplate assembly of the battery pack array.

3. The assembly of claim 2, wherein the plate is an outer endplate, and the endplate assembly further includes an inner spacer that separates the outer endplate from a plurality of battery cells, the compression limiter integrated into the outer endplate.

4. The assembly of claim 3, wherein the inner spacer includes a notch that receives at least some of the curled portion of the plate.

5. The assembly of claim 1, wherein the compression limiter is integrated into a sideplate of the battery pack.

6. The assembly of claim 1, wherein the compression limiter has a circular axial cross-section.

7. The assembly of claim 1, wherein the compression limiter has a non-circular axial cross-section.

8. The assembly of claim 1, wherein the primary surface of the plate is an inwardly facing surface that faces a plurality of cells of the battery pack array, the primary surface of the plate and the side edge spaced a distance from each other to provide a gap between the primary surface and the side edge.

9. The assembly of claim 1, wherein the threaded mechanical fastener secures the plate to a heat exchanger plate.

10. The assembly of claim 1, wherein the threaded mechanical fastener secures the plate to a battery pack structure other than a heat exchanger plate.

11. The assembly of claim 1, wherein the compression limiter is configured to limit compression associated with torqueing the threaded mechanical fastener.

12. The assembly of claim 1, wherein the compression limiter is part of a continuous monolithic structure with the remaining portions of the plate.

13. The assembly of claim 1, wherein the curled portion is a laterally outermost portion of the plate.

14. The assembly of claim 1, wherein the side edge is transverse to the inner surface.

15. An assembly, comprising:
an endplate of a battery pack array, the endplate having an inwardly facing surface that faces a plurality of battery cells and an outwardly facing surface opposite the inwardly facing surface, the inwardly facing surface and the outwardly facing surface each extending from a first side edge to an second side edge that is opposite the first side edge; and
a compression limiter having a longitudinal axis, the compression limiter integrated into the endplate and being a portion of the endplate that is curled about the longitudinal axis to provide an opening, the portion of the endplate curled such that the first side edge of the endplate faces the inwardly facing surface; and a mechanical fastener at least partially received within the opening, the compression limiter is configured to limit compression associated with securing the mechanical fastener to a battery pack structure.

16. The assembly of claim 15, wherein the compression limiter is curled such that the first side edge of the plate faces the inwardly facing surface of the endplate.

17. The assembly of claim 15, wherein the compression limiter is part of a continuous monolithic structure with the remaining portions of the endplate.

18. The assembly of claim 15, further comprising the battery pack structure as a heat exchanger plate, the mechanical fastener extending longitudinally through the opening and threadably engaged with the heat exchanger plate to pull the plate relatively toward the heat exchanger plate.

19. The assembly of claim 16, wherein the first side edge of the endplate is spaced from the inwardly facing surface of the endplate to provide an open gap between the first side edge of the plate and the inwardly facing surface.

20. The assembly of claim 16, wherein the endplate is an outer endplate, and the assembly further includes an inner spacer that separates the outer endplate from a plurality of battery cells, the compression limiter integrated into the outer endplate, wherein a material composition of the outer endplate if different than a material composition of the inner endplate.

* * * * *